United States Patent [19]
Denz et al.

[11] Patent Number: 5,604,305
[45] Date of Patent: Feb. 18, 1997

[54] METHOD FOR AVOIDING INCORRECT MESSAGES IN THE DIAGNOSIS OF ADJUSTING DEVICES SUCH AS FLOW VALVES IN MOTOR VEHICLES

[75] Inventors: Helmut Denz, Stuttgart; Andreas Blumenstock, Ludwigsburg, both of Germany

[73] Assignee: Robert Bosch GmbH, Stuttgart, Germany

[21] Appl. No.: 404,755

[22] Filed: Mar. 15, 1995

[30] Foreign Application Priority Data

May 21, 1994 [DE] Germany ............... 44 18 010.1

[51] Int. Cl.$^6$ .................................. G01M 15/00
[52] U.S. Cl. ................................................ 73/118.1
[58] Field of Search .................. 73/117.2, 118.1, 73/119 R, 117.3, 116, 23.32, 35.03, 35.06

[56] References Cited

U.S. PATENT DOCUMENTS

| | | | |
|---|---|---|---|
| 4,620,440 | 11/1986 | Thompson | 73/118.1 |
| 5,040,117 | 8/1991 | Shyu et al. | 73/117.2 |
| 5,103,655 | 4/1992 | Kano et al. | 73/118.1 |
| 5,117,682 | 6/1992 | Amano | 73/118.1 |
| 5,124,919 | 6/1992 | Kastelle | 73/118.1 |
| 5,150,689 | 9/1992 | Yano et al. | 73/118.1 |
| 5,182,945 | 2/1993 | Setter | 73/118.1 |
| 5,207,093 | 5/1993 | Maeda | 73/118.1 |
| 5,209,212 | 5/1993 | Viess et al. | 73/117.2 |
| 5,216,991 | 6/1993 | Iida et al. | |
| 5,243,853 | 9/1993 | Steinbrenner et al. | |
| 5,257,534 | 11/1993 | Azuma et al. | 73/118.1 |
| 5,406,836 | 4/1995 | Smith | 73/118.1 |
| 5,408,871 | 4/1995 | Lieder et al. | 73/118.1 |

FOREIGN PATENT DOCUMENTS

63/263262  10/1988  Japan.

Primary Examiner—Richard Chilcot
Assistant Examiner—Eric S. McCall
Attorney, Agent, or Firm—Walter Ottesen

[57] ABSTRACT

The invention relates to a method for diagnosing the function of an adjusting device and includes the steps of: driving the adjusting device, detecting the effect of driving the adjusting device on a predetermined variable operatively coupled to the adjusting device; determining the adjusting device to be operable when the effect lies in a first range of possible values; and, determining the adjusting device to be inoperable when the effect lies in a second range of possible values. A third range is defined which separates the first and second ranges from each other. The method is interrupted or repeated when the effect lies in the third range.

1 Claim, 3 Drawing Sheets

METHOD FOR AVOIDING INCORRECT MESSAGES IN THE DIAGNOSIS OF ADJUSTING DEVICES SUCH AS FLOW VALVES IN MOTOR VEHICLES

FIELD OF THE INVENTION

The invention relates to a method for checking the operability of adjusting devices such as flow valves in motor vehicles.

BACKGROUND OF THE INVENTION

A tank-venting valve is an example of a flow valve. A tank-venting valve is used as a component of a tank-venting apparatus for a motor vehicle driven by an internal combustion engine. Tank-venting apparatus function to collect fuel vapors, to store these vapors and to supply the vapors to the engine for combustion. The fuel vapors are formed in a supply tank by vaporization during tanking and/or operation of the motor vehicle. A defective tank-venting valve can reduce the quality of the exhaust gas of the internal combustion engine. Statutory requirements exist in accordance with which the tank-venting valve is monitored during operation of the internal combustion engine (on-board diagnostics).

U.S. Pat. No. 5,243,853 discloses a system for monitoring the operability of a tank-venting valve based on an internal combustion engine having a controlled idle rpm and a controlled air/fuel mixture ratio ($\lambda$). This state of the art provides that the tank-venting valve is opened during idle of the engine and the reactions of the lambda control or of the idle control are evaluated for diagnosis. These reactions are different in dependence upon the composition of the vapor flowing through the open tank-venting valve. If, in an extreme case, the gas consists of pure air or, in another extreme case, the gas is pure fuel vapor, then a corresponding compensating enrichment or leaning takes place via the lambda control. If the enrichment or leaning exceeds a predetermined threshold value, then the tank-venting valve is considered to be in order.

If the composition of the gas corresponds to the desired value (such as $\lambda=1$) wanted for the operation of the engine, then the lambda controller does not carry out a correction. The influence of the additional mixture quantity would then lead to an increased idle rpm in the absence of a countering actuating intervention by the idle controller. This additional mixture quantity results when the opening cross sections of the tank-venting valve are large. The tank-venting valve is in order when a reaction of the idle controller occurs which exceeds a predetermined threshold value. If in contrast, this threshold value is not exceeded, then the tank-venting valve is deemed to be defective.

It has been shown that the reliability of the diagnostic data of the described system is reduced under certain conditions such as during operation of the motor vehicle at high elevations above sea level or in combination with driving ancillary equipment during idle of the engine.

To avoid incorrect data, it is known in this context, for example, to monitor the load of the engine during the diagnosis and to interrupt the diagnosis when load changes occur. During idle of the internal combustion engine, such load changes are caused, for example, by: actuation of the power steering, switching in electrical consumers or engaging a drive gear in a vehicle having an automatic transmission. It has further been shown that the reliability of the diagnostic data is also reduced with increasing load during idle so that even for constant increased load (such as caused by a climate control which is switched in), the problem is present that incorrect messages occur during the diagnosis. Blanking out the diagnosis in such operating states can therefore lead to a situation (especially in summer) that an existing defect remains unnoticed longer than necessary.

SUMMARY OF THE INVENTION

In view of the foregoing, it is an object of the invention to provide a diagnostic method for adjusting devices so that the reliability of the data from the method is only insignificantly reduced by the instantaneous load condition of the internal combustion engine.

The method of the invention is performed in the context of a system which includes the adjusting device as well as an element operatively coupled thereto. This element has an operation which is characterized by a variable which exhibits a change of values thereof in response to an actuation of the adjusting device. The adjusting device has a functional operability which can have a quality extending from being in order to being defective.

The method of the invention is for diagnosing the functional operability of the adjusting device and includes the steps of: actuating the adjusting device; detecting the change in the values of the variable produced by actuating the adjusting device; evaluating the functional operability of the adjusting device to be:

(a) in order when the variable lies within a first range of the values thereof; and, (b) inoperative when the variable lies within a second range of the values thereof;

defining a third range of the values of the variable separating the first and second ranges of the values; and, terminating and/or repeating the diagnosis when the values of the variable lie in the third range.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
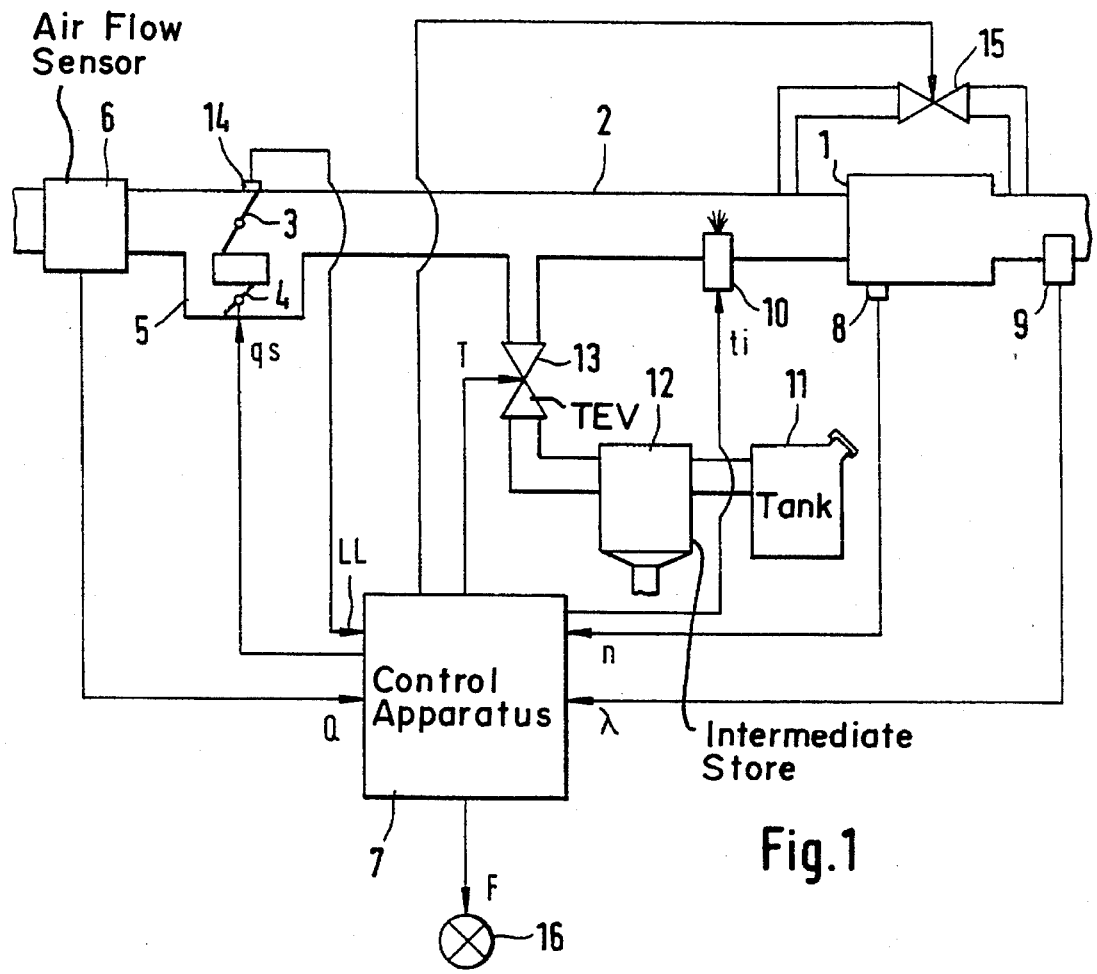
FIG. 1 is a schematic showing the technical setting in which the method of the invention is applied, such as an internal combustion engine equipped with a tank-venting apparatus. The schematic also shows various adjusting devices utilized during operation of the engine and sensors as well as a control apparatus.

FIG. 1 shows an internal combustion engine 1 which is supplied with an air/fuel mixture from an intake pipe 2. The quantity Q of the inducted air is adapted to the requirement of the engine by the position of the throttle flap 3 and an idle-adjusting device 4 in a bypass 5. The quantity of inducted air is detected by a means 6 for measuring air flow. A control apparatus 7 forms a fuel-metering signal ti for driving a fuel-metering means 10. The signal ti is formed from the signal Q, the signal (n) of a rpm sensor 8 and the signal λ of an exhaust-gas probe 9. The evaporated fuel vapors in a supply tank 11 are received by an intermediate store 12 and conducted further via a tank-venting valve 13 to the intake pipe 2. Reference numeral 15 identifies an exhaust-gas return valve.

The tank-venting valve 13 is driven by the control apparatus 7 with a signal T in dependence upon the operating conditions of the internal combustion engine. The control apparatus shown also receives a signal LL from an idle switch 14. A means 16 to display or store diagnostic results is driven by the control apparatus, as required, by a signal F.

Figure 2:
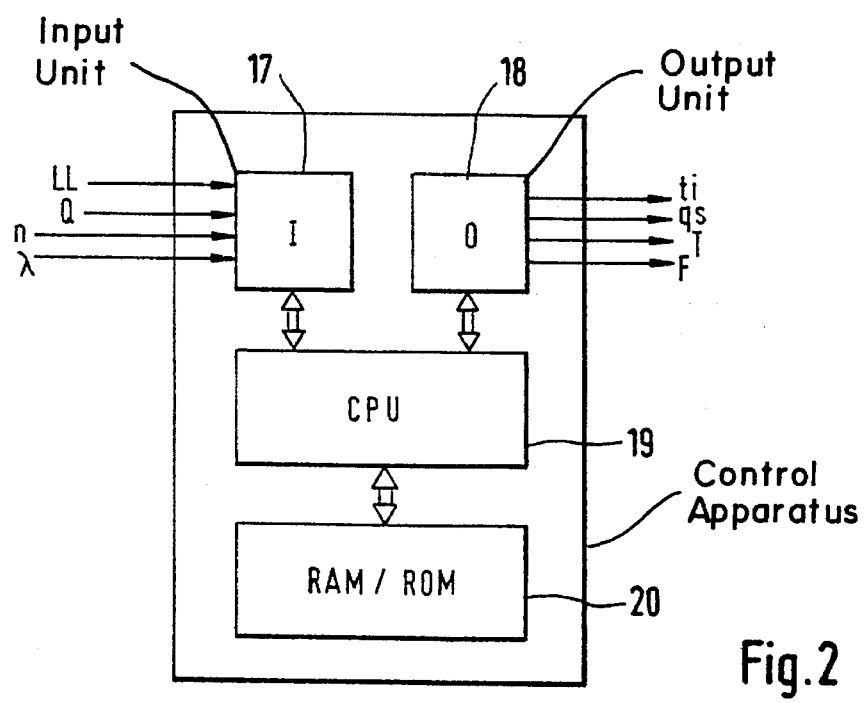
FIG. 2 is a block diagram which shows the operation of the control apparatus of FIG. 1.

The configuration of a control apparatus, which is suitable for carrying out the method of the invention, is shown in FIG. 2. The signals LL, Q, n and λ mentioned above are supplied to an input unit 17. An output unit 18 outputs signals ti, qs, T and F. A computation unit 19 mediates between the input unit 17 and the output unit 18 in accordance with programs and data stored in a memory 20.

Figure 3:
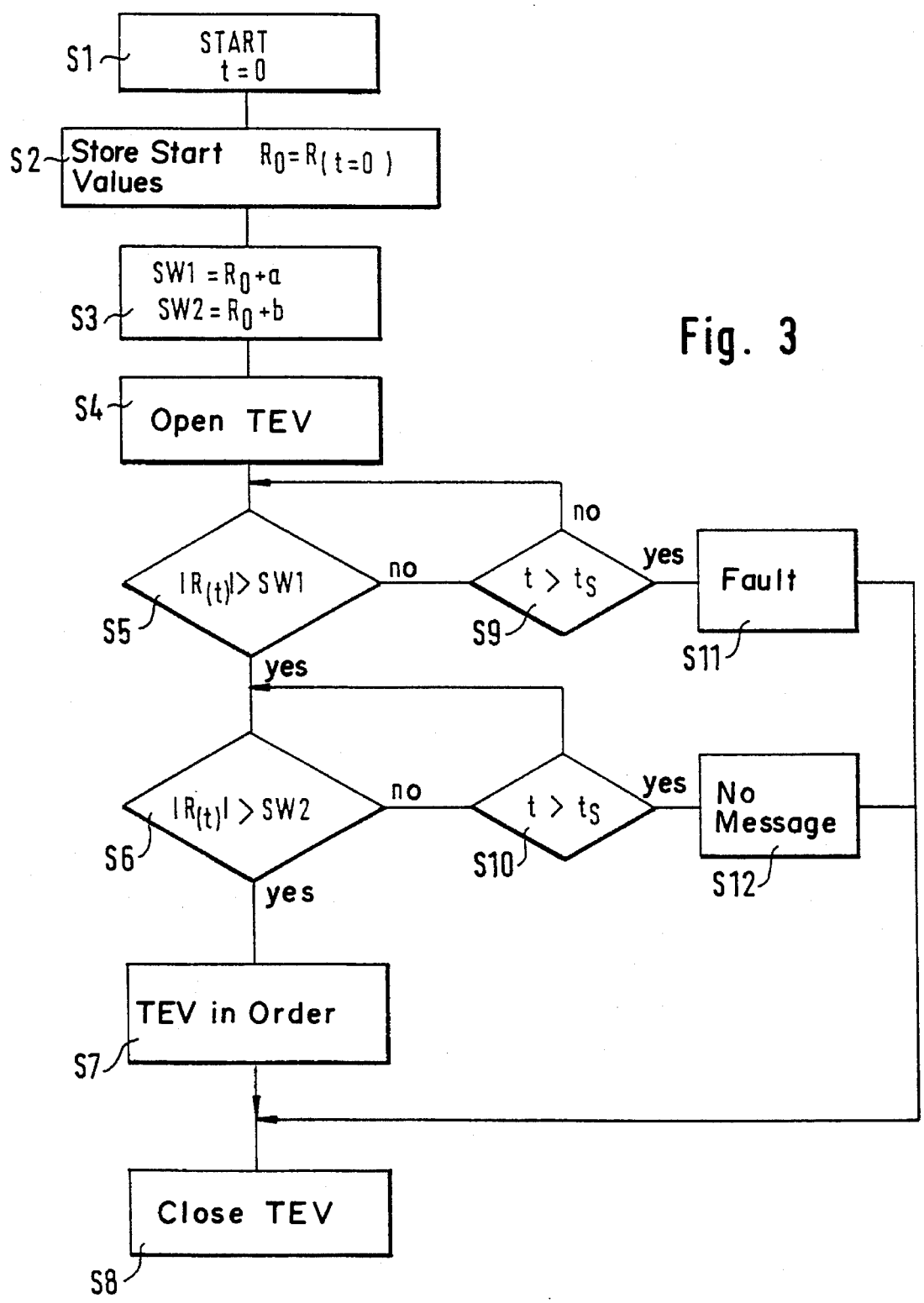
FIG. 3 is a flowchart exemplifying an embodiment of the method of the invention which is carried out with the aid of the control apparatus of FIG. 2; and, FIG. 4 shows signal traces as they occur when driving the adjusting devices.

FIG. 3 shows a flowchart as an example of a program suitable for carrying out the method of the invention.

The cycle illustrated in FIG. 3 for carrying out the diagnosis of a tank-venting valve includes the steps S1 to S12.

After the diagnosis is started at time point t=0 in step S1, at least one value $R_0$, of an operating variable R is detected as a start value $R_0$ in step S2. The value $R_0$ is current at the start of the diagnosis.

Typical values for R are: instantaneous lambda value, instantaneous rpm value, instantaneous load value and instantaneous drive pulse-duty factor of the idle adjusting device 4.

Step S3 operates to form a lower threshold value SW1 and an upper threshold value SW2 from $R_0$.

The threshold value inquiry steps (S5, S6) follow after the opening of the tank-venting valve TEV in step S4. If both threshold values SW1, SW2 are exceeded in magnitude, then the tank-venting valve and the corresponding control chain are deemed to be in order (step S7). In contrast, if the lower threshold value SW1 is not reached within a pregiven time ts, then the method continues via steps S5 and S9 to a fault message in step S11. If the lower threshold value SW1 is exceeded, but the upper threshold value SW2 is not exceeded within the pregiven time ts, then the step S12 is reached via the steps S6 and S10. Step S12 essentially corresponds to the determination that this diagnostic cycle does not permit a definitive message as to the operability of the tank-venting valve. The tank-venting valve 13 is closed with step S8 which follows after the alternatives of step S7, S11 or S12.

Figure 4:
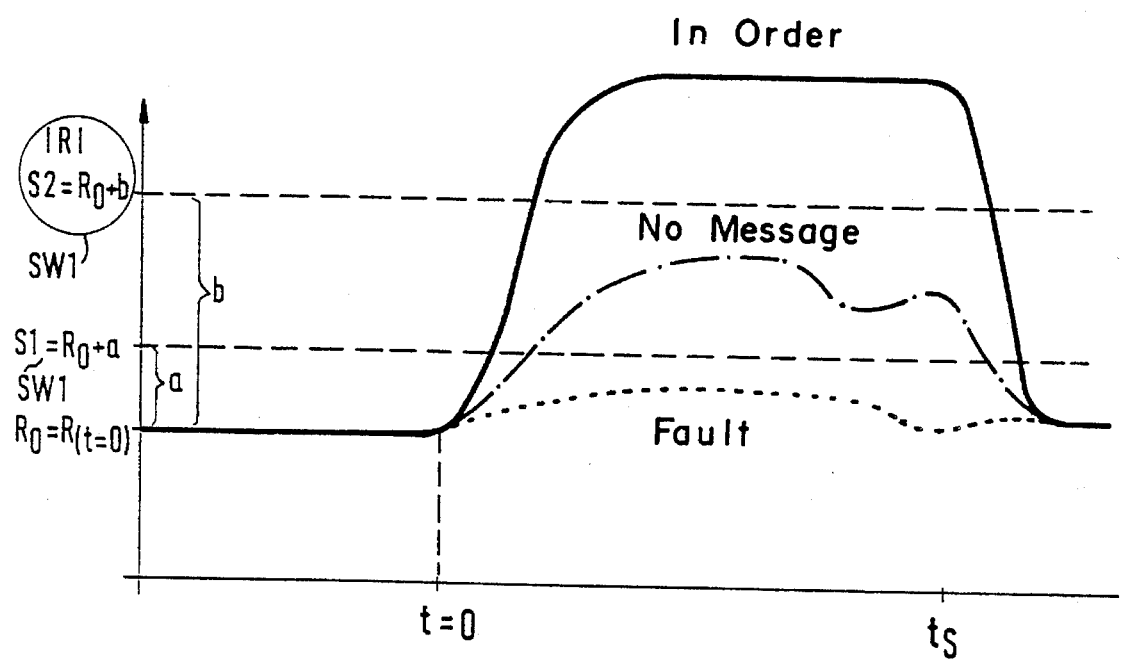

FIG. 4 shows the signal traces |R(t)| which correspond to the following three cases:

(a) fault (dotted line);

(b) no definitive message (dot-dash line); and, (c) operation is in order (solid line).

The signal traces of FIG. 4 emphasize the disturbance spacing (b-a) which separates the definitive messages "in order" and "fault". The spectrum of possible values of |R| is thereby subdivided into three ranges of possible values. The adjusting device can only then be deemed operational when the reaction |R| (effect) lies in a first range above SW2 and can be deemed to be inoperable only when the effect lies in a second range of possible values below threshold SW1.

It is understood that the lower threshold value SW1 is so determined that it is, in any event, exceeded when an operable tank-venting valve is driven, that is, even when disturbances occur.

Disturbances can occur because of additional loads on the engine at idle as they are caused, for example, by a power-steering system, a climate control or other consumers. A larger quantity of air must be inducted in order to operate the internal combustion engine at the same rpm notwithstanding the additional load. This quantity of air has to be in the order of magnitude of the vapor quantity flowing via the tank-venting valve. The additional air or additional mixture necessary because of the additional load can be inducted from the tank-venting system when the tank-venting valve is open whereby a reaction of the idle control on the opening of the tank-venting valve is reduced. This case corresponds to the dot-dash line in FIG. 4.

Since the threshold value SW2 is not reached in this case, a fault message erroneously occurs in accordance with the state of the art. In contrast, a definitive message is avoided in this case in accordance with the invention.

This applies also for the cases in which a reduced pressure difference occurs at the tank-venting valve TEV during the diagnosis. Small pressure differences result during operation of the internal combustion engine at high elevations above sea level because of the reduced atmospheric pressure present at these elevations or when the idle adjusting device is wide open because of the intake pressure which increases in this case. Both situations cause a reduction of the quantity of vapor flowing through the tank-venting valve so that the reaction of the idle controller to an opening of the tank-venting valve is reduced.

Erroneously resulting fault messages in these cases are virtually avoided because of the disturbance spacing of the invention between the threshold values SW1 and SW2.

The invention is not limited to the application of diagnosing a tank-venting valve but can be applied for every diagnosis of an adjusting device. The invention is especially advantageous in those cases in which similar conditions are present as with the tank-venting valve (TEV), that is, for example, for the diagnosis of flow valves such as an idle adjusting device or exhaust-gas return valve.

It is understood that the foregoing description is that of the preferred embodiments of the invention and that various changes and modifications may be made thereto without departing from the spirit and scope of the invention as defined in the appended claims.

What is claimed is:

1. In a tank-venting system including an adjusting device defined by a tank-venting valve which is operatively coupled to an element of the system having an operation characterized by an operating variable which exhibits a change in the values thereof in response to an actuation of said tank-venting valve, said variable being selected from the group including engine speed (n), engine load (L), air number (λ), pulse-duty factor of idle adjusting device and intake pressure (p), said tank-venting valve which can have a quality extending from being in order to being defective, a method for diagnosing the functional operability of said tank-venting valve, the method comprising the steps of:

determining an upper absolute threshold value (SW2) for said operating variable above which the operation of said tank-venting valve is in order thereby defining a first range of values extending from said upper absolute threshold value (SW2) to infinity;

determining a lower absolute threshold value (SW1) for said operating variable below which the operation of said tank-venting valve is defective thereby defining a second range of values extending from said lower absolute threshold value (SW1) to zero;

assuming a third range of values of said operating variable between said absolute threshold values (SW1) and (SW2) wherein it is uncertain that the operation of tank-venting valve is defective or in order (no message);

actuating the tank-venting valve;

detecting said change in said values of said variable produced by actuating said tank-venting valve;

evaluating the functional operability of the tank-venting valve to be:
 (a) in order when said variable lies within said first range of said values thereof; and,
 (b) inoperative when said variable lies within said second range of said values thereof; and, terminating and/or repeating the diagnosis when said values of said variable lie in said third range.

* * * * *